United States Patent [19]
Bolivar

[11] Patent Number: 4,741,260
[45] Date of Patent: May 3, 1988

[54] SAFETY LOCK IN STEAM PRESSURE COFFEE MAKERS

[75] Inventor: Domingo F. A. Bolivar, Ermua Vizcaya, Spain

[73] Assignee: Oficina De Investigacion Agrupada, S.A., Eibar, Spain

[21] Appl. No.: 828,026

[22] Filed: Feb. 10, 1986

[51] Int. Cl.$^4$ ............................................. A47J 31/00
[52] U.S. Cl. ...................................... 99/279; 99/293; 99/299; 126/369; 220/316
[58] Field of Search ............... 99/279, 280, 281, 282, 99/283, 285, 293, 294, 299, 300, 302 R; 426/433; 126/348, 369, 369.2, 369.3, 373, 389, 374; 220/316

[56] References Cited
U.S. PATENT DOCUMENTS

| | | | |
|---|---|---|---|
| 3,605,337 | 5/1969 | Rodgers | 220/316 |
| 4,204,465 | 5/1980 | Knecht | 99/283 |
| 4,287,817 | 9/1981 | Moskowitz | 99/293 |
| 4,444,331 | 4/1984 | Lankston | 220/316 |

Primary Examiner—Robert W. Jenkins
Attorney, Agent, or Firm—Henry C. Nields

[57] ABSTRACT

A safety lock in a steam pressure coffee maker is disclosed. The safety lock comprises a piston fitted in an orifice of the coffee maker body. When the pressure in the coffee maker chamber is sufficiently high, the piston is moved causing the piston rod to enter recesses provided along the periphery of a threaded plug which closes the main aperture. With the piston rod in this position, the threaded plug cannot be turned, thereby ensuring that the main aperture remains closed until the high pressure conditions no longer prevail.

3 Claims, 1 Drawing Sheet

SAFETY LOCK IN STEAM PRESSURE COFFEE MAKERS

The subject of the present descriptive memorandum is to state the object of the industrial and commercial privilege, exclusive in the national territory, of a Patent of Invention, in accordance with current Industrial Property Legislation which, as indicated by the title, involves a "SAFETY LOCK IN STEAM PRESSURE COFFEE MAKERS."

A coffee maker is an appliance used to make coffee. The coffee is obtained by the following procedures:
  by passing pressurized steam through the coffee;
  by passing hot or boiling water through the coffee.

In our case we refer to steam pressure coffee makers of the domestic type. These coffee makers operate at high working pressures, and are provided with a mouth, with its corresponding lid, through which they are filled with water. This mouth is in communication with the steam chamber of the coffer maker.

Due to the high operating pressures, and since the users for which these coffee makers are intended are not specialists, there is the risk of accidents occurring. Thus, for example, if there is a high pressure in the steam chamber, and the user attempts to loosen the lid to add more water, the lid may fly off and the steam spurt out, with the consequent risk of scalding.

At the present time, such coffee makers contain no safety device to prevent the aforementioned hazard. For this reason it is necessary to provide a safety system which prevents the user from being able to open the lid when the coffee maker is at a high pressure.

The subject of this invention is a safety device which locks the lid when high pressure conditions prevail inside the container. The safety device consists of a piston fitted in an orifice in the coffee maker body. This piston is capable of moving when the pressure in the coffee maker chamber is sufficiently high. When the pressure in the coffee maker chamber increases, there is an increased pressure on the piston plunger, causing the piston to move, such that the rod of the piston enters recesses provided in the periphery of the threaded plug so that the lid can then not be opened. The piston is provided with a spring which resists its movement, being calibrated in such a way that, for sufficiently high pressure values inside the steam chamber, the force with which this spring opposes the movement of the piston is overcome.

To prevent the lid from being unscrewed, it is sufficient for the recesses in the lid to be a series of orifices in the lid, so that when the locking device is activated both the opening and closing movements of the lid would be prevented. However, practice shows that the user often does not tighten the lid properly in the initial closing maneuver and as a consequence the coincidence of one of the orifices in the lid with the upper rod does not always occur initially, which would not affect the safety function because locking would also occur at the beginning of unscrewing and alignment of one of the orifices with the upper rod, but sudden locking impacts would occur which are not desirable.

It also happens that the gasket (10) of the lid decreases in thickness with use and as a consequence it is necessary to twist through a larger angle to produce closure and for this reason it is useful for the locking device to be adaptable to allow its safety function to permit different angular positions.

To overcome these disadvantages and improve the results, the recesses in the lid are a plurality of notches with one of their faces inclined so that, if the coffee maker is insufficiently closed, it permits greater tightening and on the contrary prevents opening.

As will be seen from the above description, the recommended mechanism, both for locking the coffee maker lid and to permit greater tightening, is extremely simple, with a minimum of parts, and achieves great reliability of the entire safety system in accordance with the rest of the appliance.

For better understanding of the nature of the invention, we show in the attached drawings (merely as an illustrative and nonlimitative example) a preferred industrial embodiment, to which we refer in our description of these drawings.

Figures 1, 2:
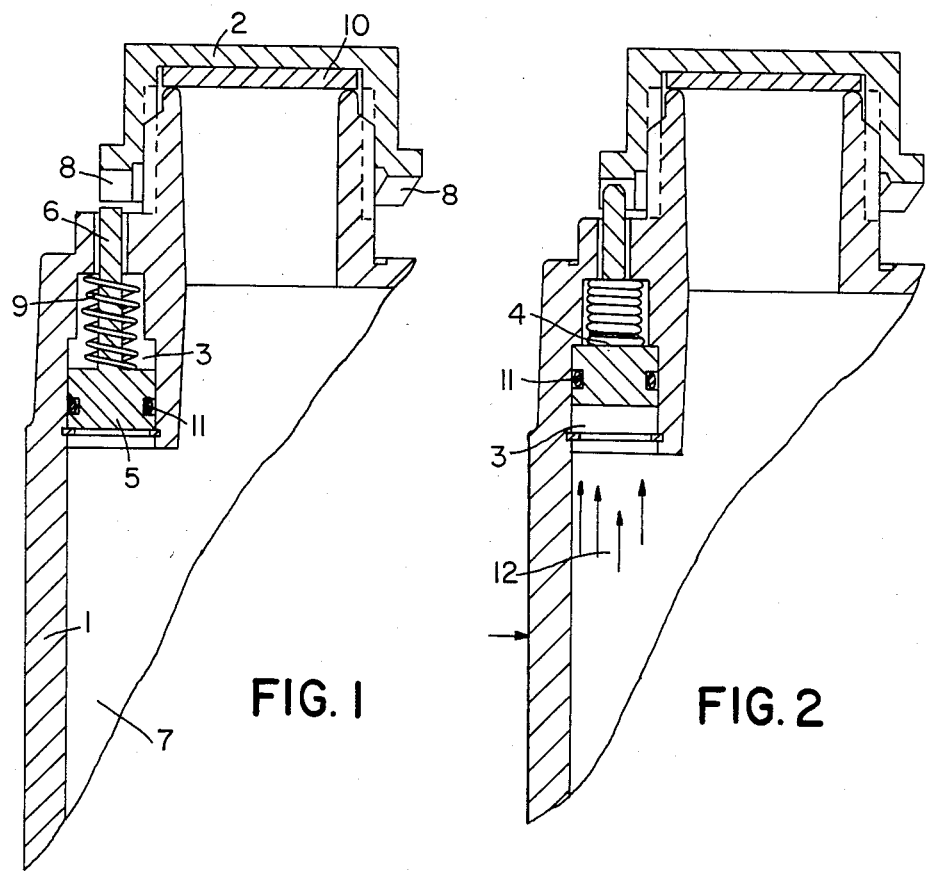
FIG. 1 represents a partial vertical section through the body of the coffee maker and the threaded plug where pressure does not exist and hence the safety mechanism is not activated.
FIG. 2 represents a partial vertical section through the body of the coffee maker and the threaded plug when pressure exists inside the coffee maker and the safety mechanism is therefore activated.
Figure 3:
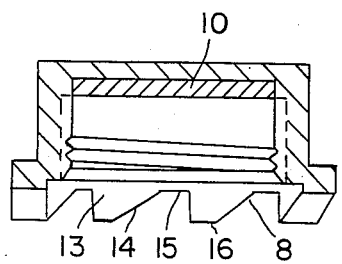
FIG. 3 represents a vertical section through the threaded plug of the coffee maker.

The following features are noted in these figures:

1. coffee maker body
2. threaded plug
3. stepped orifice
4. piston
5. piston plunger
6. piston rod
7. steam chamber
8. recesses
9. spring
10. lid gasket
11. O-ring segment
12. action of pressure in steam chamber on piston plunger
13. serrations
14. inclined zone of serrations
15. upper horizontal section of serrations
16. lower horizontal section of serrations The model subject of this invention is a safety device for a steam pressure coffee maker which, as can be seen in FIGS. (1) and (2), basically consists of a piston 4 inserted into an orifice (3) made in the body of coffee maker (1). Rod 6 of said piston (4) is inserted into recesses (8) provided in the periphery of threaded plug (2), which closes the coffee maker, when the safety device is activated.

FIG. (1) shows that when no pressure exists in steam chamber (7), opposing spring (9) retains the plunger of piston (5) in its lower or resting position and consequently piston rod (6) cannot emerge through the upper portion of stepped orifice (3), so that piston rod (6) is not inserted in recesses (8) in the threaded plug. In this position, when the safety mechanism is not activated, the lid can be acted upon on order to open it.

As the pressure in steam chamber (7) rises, the force (12) acting on piston plunger (5) increases, and the latter moves along stepped orifice (3) in the body of coffee maker (1). Movement of piston plunger (5) causes movement of piston rod (6) such that it is inserted in recesses (8) in threaded plug (2).

FIG. (2) gives a better view of the whole, when sufficiently high pressure values in steam chamber (7) cause opposing spring (9) to be fully compressed. It can also be seen that piston rod (6) is fully inserted into recesses (8) of threaded plug (2), preventing movement of the latter. It can also be seen that piston plunger (5) has an O-ring (11) to prevent pressurized steam from leaking through stepped orifice (3).

In order for piston (4) to permit rotation of plug (2) in the tightening direction when the pressure in steam chamber (7) is high but to lock it in the opening direction, recesses (8) provided in the periphery of threaded plug (2) are configured in the form of serrations (13) facing downward and with their planes inclined (14) in the opening direction of plug (2).

The serrations (13) are composed of the following three zones:

Inclined zones (14) of serrations (13). When piston rod (6) is acting on this zone, it is possible to move plug (2) in the tightening direction since, as plug (2) turns, piston rod (6) slides from lower horizontal sections (16) of serrations (15) to the upper horizontal sections (15) of serrations (13).

Upper horizontal sections (15) of serrations (13). When piston rod (6) is acting on this zone, all turning of plug (2) is prevented. This is the most extreme position of rod (6). In order for rod (6) to be perfectly seated in the most extreme position, the length of said horizontal sections (15) must not be less than the diameter of the end of rod (6).

Lower horizontal sections (16) of serrations (13). When piston rod (6) is acting on this zone, two types of actions can occur: When plug (2) is moved in the opening direction, a moment will occur when rod (6) is opposite upper horizontal section (15) of the immediately previous serration. After this moment it becomes quite impossible for it to turn. The other possible type of action is when plug (2) is moved in the closing direction, causing said plug (2) to move and rod (6) to be opposite the inclined zone (14) of serrations (13).

The nature of the present invention having been sufficiently described, together with its industrial implementation, it need only be added that changes in shape, material, and arrangement.may be made to the whole or to the component parts without departing from the framework of the invention, inasmuch as such alterations do not alter its basis.

The applicant, protected by International Agreements on Industrial Property, reserves the right to extend the present application to foreign countries if possible, claiming the same priority of the present application.

I claim:

1. A steam pressure coffee maker having a safety lock, comprising:

a body defining a steam chamber, said body having a main aperture and a stepped orifice having at least one step;

a threaded plug for closing said main aperture, said threaded plug having recesses provided along its periphery so as to define a circular pattern;

a piston within said stepped orifice, said piston comprising a rod and a plunger, said plunger being in communication with said steam chamber, and said rod being in communication with the exterior of said body at a point at which it is located opposite a part of said circular pattern; and an opposing spring positioned between said plunger and a step of said stepped orifice;

whereby said opposing spring, when in the resting position, retains said rod inside said stepped orifice, but when sufficient steam builds up in the chamber for the steam pressure on the plunger to be greater than the resistance of the opposing spring, said spring is compressed, and the rod of the piston projects out of said body of the coffee maker and can penetrate one of said recesses in the threaded plug, preventing said threaded plug from turning and preventing opening of said plug while these steam pressure conditions prevail.

2. The coffee maker of claim 1 wherein said recesses provided along the periphery of the threaded plug comprise a plurality of serrations facing downward, said serrations having inclined planes oriented so as to permit turning of said threaded plug in the tightening direction but preventing said threaded plug from turning in the opposite direction when said piston is moved by the steam pressure of the coffee maker.

3. The coffee maker of claim 2 wherein each serration has at its bottom a horizontal section whose length is no less than the diameter of the end of the rod.

* * * * *